Patented Oct. 14, 1952

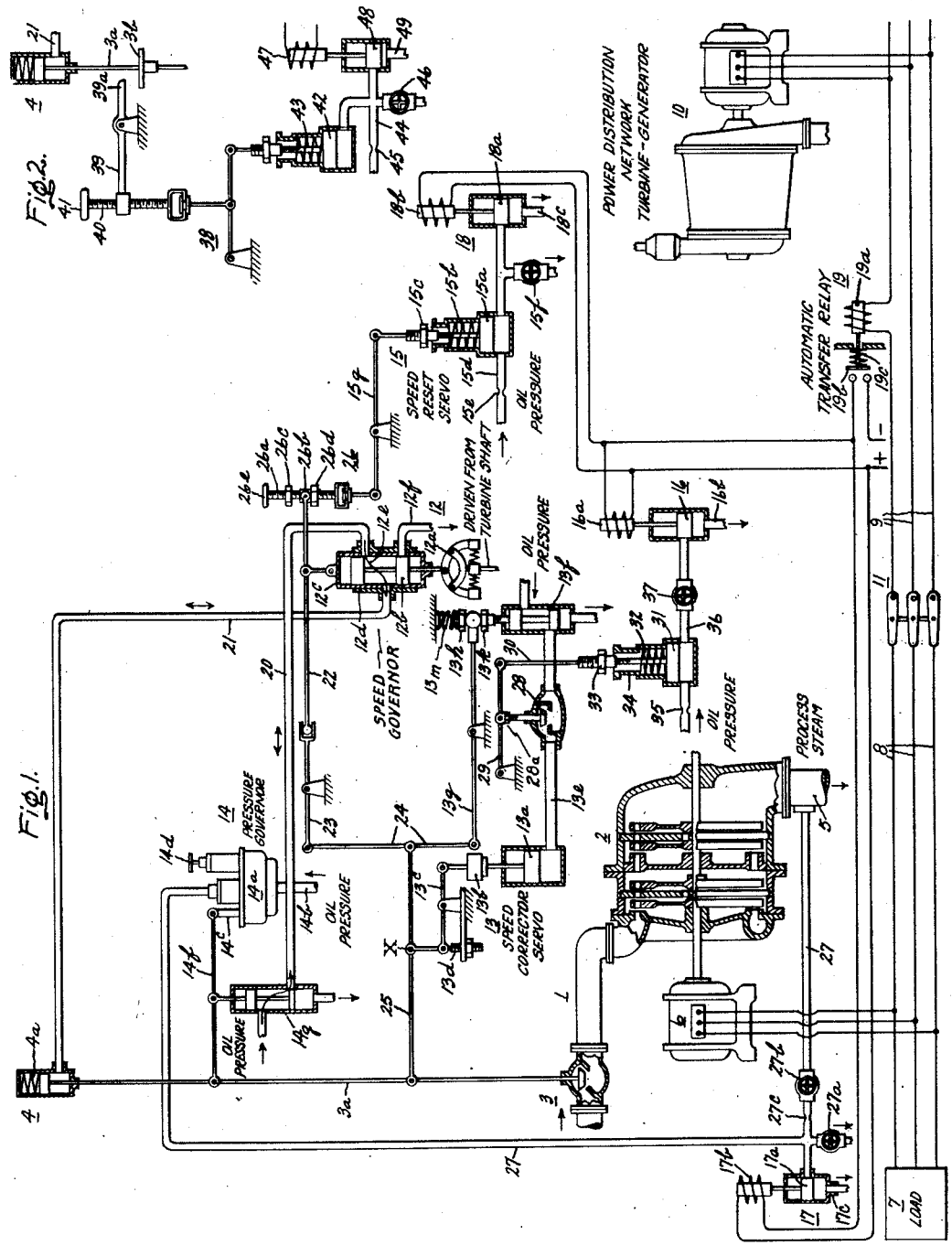

2,614,229

UNITED STATES PATENT OFFICE 2,614,229

MULTIPLE GOVERNING SYSTEM FOR TURBINE WITH AUTOMATIC TRANSFER

Jack M. Baker, South Peabody, Mass., assignor to General Electric Company, a corporation of New York Application January 4, 1952, Serial No. 264,928

7 Claims. (Cl. 290—4)

This invention relates to hydraulic-mechanical governing systems for prime movers such as steam turbines, particularly to governing means for a non-condensing type steam turbine having two or more modes of governing, and arranged to provide automatic transfer from one type of governing to another.

In industrial plants such as paper or textile mills, it is usually found most economical to use extraction or non-condensing type turbines for generating electricity and furnishing steam for various process and heating purposes. Since the reliability of the supply of electrical energy is of substantial importance in connection with such continuous industrial processes, the mill's turbine-generator unit will ordinarily be interconnected with an electric power distribution network so either, or both together, can furnish the electrical energy needed in the mill. The steam used for process purposes will first drive the turbine to generate electrical energy, and any power required in the mill over and above the amount generated by the turbine will be supplied from the power distribution network. When thus connected to an external power distribution network, the speed of the mill's turbine-generator unit will be determined by this electrical interconnection with the other turbine-generators supplying the network. When thus interconnected with the network, the mill's turbine will be governed by suitable devices sensitive to conditions other than speed, for instance, means arranged to hold constant the pressure of the exhaust steam used for process purposes, regardless of variations in the rate of flow thereof.

In the event of a fault in the external electrical power network, or when the tie-line circuit breaker connecting the mill's turbine-generator to the network is opened for any reason, it is then necessary that the mill's turbine be so governed as to hold the speed constant, in order that the frequency of the electrical energy supplied to the electric motors driving the mill will be maintained essentially constant. It will of course be appreciated by those familiar with such power-plants that any slightest variation from the preselected desired speed may result in serious breakage in the thread of a textile mill or the web in a paper mill, etc. For such service, it is absolutely essential that, in the event of a disturbance in the power network, or failure of the electrical energy supply from the network, that substantially instantaneous and automatic conversion of the mill's turbine-governing system shall be effected, with no important disturbance in the frequency of the electrical energy supplied to the mill's motors.

Accordingly, the purpose of the present invention is to provide an improved governing system for a turbine supplying both process steam and electrical energy, with automatic means for quickly changing the governor from one mode of operation to another.

A further object is to provide a turbine governor of the type described which will ordinarily hold constant some operating condition other than speed, such as exhaust pressure or turbine load, but which will automatically convert the governing system to hold speed constant upon occurrence of a preselected event such as failure of the supply of electrical energy from an external power distribution network.

Other objects and advantages will become apparent from the following description taken in connection with the accompanying drawing, in which Figure 1 is a diagrammatic representation of a steam turbine governing system incorporating the invention, and Figure 2 is an alternate form of one of the governing sub-combinations.

Generally stated, the invention is practiced by employing a known type of speed governor with special speed corrector means adapted to effect "isochronous" operation (no net speed change as load varies) in combination with other governing means for holding constant some other operating condition, such as turbine load or exhaust steam pressure, with automatic means for disabling certain of the governing mechanisms and transferring control to the speed governor, special means being provided to reduce the time required for the transfer and to insure stability during the transition period.

Referring now more particularly to the drawing, the governing system is illustrated as embodied in a hydraulic-mechanical arrangement for controlling the flow of motive fluid through steam inlet conduit 1 to the multi-stage turbine 2. Motive fluid flow is controlled by a suitable throttle valve 3 positioned by hydraulic motor 4. The turbine 2 supplies process steam through exhaust conduit 5 and drives a generator 6 connected to supply electrical energy to a load indicated at 7. In a mill for manufacturing paper or textiles, this load would of course represent electric motors driving the paper or textile machinery. Load 7 is also connected by a "tie-line" indicated at 8 to an external power distribution network 9 supplied by a plurality of turbine generators, one of which is indicated at 10. The load 7 may be disconnected from the network 9 by a circuit breaker indicated at 11.

Generally speaking, the turbine governing system comprises a conventional speed governor indicated at 12, speed corrector servo mechanism 13 for effecting isochronous speed regulation, a pressure governor 14, a speed-resetting servo mechanism 15, and a plurality of solenoid operated dump valves 16, 17, 18, connected to be energized simultaneously from a suitable power source by an automatic transfer relay 19 when the circuit breaker 11 is opened. In the present case, the relay 19 is shown as having a current responsive coil 19a adapted to hold the bridging contacts 19b in open position when current is flowing in the tie-line circuit 8, but permitting spring 19c to move contacts 19b to closed position so as to energize solenoids 16, 17, 18 when the tie-line current fails. It will of course be understood that any other equivalent devices, such as a frequency-responsive relay sensitive to the frequency in the network, may be used for energizing these solenoids automatically when circuit breaker 11 is tripped to the open condition.

The hydraulic speed governor 12 is of conventional arrangement, and includes a speed responsive fly-ball governor 12a, or the equivalent, connected to position a hydraulic pilot 12b. The pilot is arranged to slide longitudinally in a pilot bushing 12c. As will be apparent from the drawing, speed governor 12 is arranged to regulate the flow of operating liquid from a supply conduit 20 to hydraulic motor 4 by way of conduit 21. It will be appreciated by those skilled in the art that there is a certain amount of leakage in the hydraulic motor 4 and past pilot land 12b to drain port 12f, so that at least a small amount of oil must be supplied continuously through conduit 20 to maintain throttle valve 3 in a given desired position.

The arrangement and operation of the speed governor 12 are well known in the art. If the speed should rise above the preselected value, the flyball governor 12a pulls pilot 12b downwardly to establish communication between hydraulic motor 4 and the drain conduit 12f, so valve rod 3a descends to close valve 3 somewhat. Conversely, a decrease in speed raises pilot 12b to admit more liquid from conduit 20 to raise valve rod 3a. It is to be noted that the condition of speed governor 12 shown in Figure 1 is that occurring when the governing system is holding constant exhaust steam pressure, there being a substantial flow of hydraulic operating liquid as indicated by arrow 12e, under the control of the pressure governor 14, as described more particularly hereinafter. When the governing system is converted so as to hold constant speed, pilot 12b is positioned relative to bushing 12c so that the pilot just covers the supply and drain ports in the bushing. Then any further movement of the pilot in one direction will immediately uncover the supply port to open steam valve 3, while a movement in the other direction from the aligned position will uncover the drain port to close valve 3.

In order to establish the speed setting of governor 12, pilot bushing 12c is connected to be positioned by a speed setting lever 22. The lefthand end of lever 22 is adapted to be positioned by a follow-up lever 23 supported on a fixed fulcrum. The other end of lever 23 is connected by a link 24 to a follow-up lever 25, the lefthand end of which is pivoted to the valve actuating rod 3a. It will be appreciated by those skilled in the art that when movement of valve spindle 3a is effected by speed governor 12 supplying operating liquid to hydraulic motor 4, the resulting movement acts through lever 25, link 24, and levers 23 and 22 to reposition bushing 12c in a direction to discontinue or diminish the supply of operating liquid to motor 4.

In order to alter the desired speed which governor 12 will maintain, the righthand end of speed setting lever 22 is adapted to be positioned by a "synchronizing device" 26, which includes a threaded rod 26a, adapted to be rotated by the manual handwheel 26e, or remotely by a suitable electric positioning motor (not shown). The righthand end of speed setting lever 22 is pivoted to a bushing 26b threadedly received on the adjusting spindle 26a and adapted to be positioned vertically within a range determined by limit stops 26c, 26d. These stops may take the form of suitable threaded bushings arranged to be adjustably secured to the spindle 26a. The upper stop 26c is the "low speed stop," while the other stop 26d is the "high speed stop." It will be observed that the bushing 26b is shown against the high speed stop 26d, representing the condition when the governing system is holding constant exhaust pressure.

For automatically setting the synchronizing device 26 so that governor 12 will hold a preselected speed, there is provided a hydraulic "speed reset servo" shown at 15 as comprising a piston 15a biased downwardly by coil spring 15b to a limiting position determined by an adjustable stop 15c. When the governing mechanism is operating to hold constant exhaust pressure, speed reset piston 15a is held in its upper-most position (as shown in the drawing) by hydraulic oil pressure supplied from a suitable pump (not shown) through conduit 15d containing a flow restricting orifice 15e. The oil pressure which normally holds piston 15a at the top of its stroke may be relieved either manually by opening a drain valve 15f or automatically by the solenoid valve 18, which includes a flow control member 18a adapted to be pulled upwardly by solenoid 18b to establish communication between conduit 15d and drain port 18c. It will be apparent that, when the hydraulic liquid in servo 15 is dumped, by either the automatic valve 18 or the manual valve 15f, the liquid will escape faster than it can be supplied through orifice 15e, with the result that spring 15b biases piston 15a to the bottom of its stroke, as determined by engagement of stop 15c with the housing of the speed reset servo. Thus the speed reset servo 15 effects positioning of the synchronizing screw 26a through lever 15g so as to cause governor 12 to hold a preselected speed, which speed is determined by suitable positioning of the adjustable stop 15c of the speed reset servo.

When in normal operation, with tie-line circuit breaker 11 closed so that the speed of turbine 2 is determined by its electrical interconnection with the power distribution network 9, the supply of motive fluid to turbine 2 by the throttle valve 3 will be regulated in accordance with some other operating condition, for instance the pressure of the process steam being delivered through turbine exhaust conduit 5. To this end, the process steam pressure is communicated by conduit 27 to the pressure responsive governor 14a. The details of governor 14a are not material to an understanding of the present invention, but this device may be, for instance, in accordance with the pressure governor disclosed in United States Patent 2,253,963 issued in the name of F. H. Van Nest on August 26, 1941 and assigned to the same assignee as the present application. It need only be noted here that governor 14a receives hydraulic operating liquid through conduit 14b and contains hydraulic motor means adapted to position an output member 14c in accordance with the dictates of the pressure signal received through conduit 27. The pressure which governor 14a will hold is determined by suitable adjustment of the hand-wheel 14d.

The output member 14c of pressure governor 14a is pivoted to one end of a pressure governor lever 14f. An intermediate portion of lever 14f is connected to position pilot valve 14g which regulates the supply of hydraulic operating liquid through conduit 20 to the speed regulating pilot 12. The lefthand end of lever 14f is connected to be positioned by throttle valve actuating rod 3a, in order to provide the follow-up effect required.

For disabling the pressure governor 14, when it is desired to operate the system so as to hold constant speed, the pressure signal in conduit 27 may be destroyed manually by opening a dump valve 27a, or automatically by the solenoid valve 17. As can be seen in Figure 1, the valve 17 comprises a flow control member 17a adapted to be pulled upwardly by solenoid 17b in order to establish communication between conduit 27 and drain port 17c.

The stability and speed response of the pressure governor 14 may be adjusted by means of a manual shut-off and throttling valve 27b in conduit 27. Excessive loss of steam through conduit 27 is prevented by a fixed orifice 27c. Thus, it will be apparent that the pressure signal is prevented from reaching the governor 14a whenever manual valve 27a or automatic valve 17 is actuated to bleed away the steam faster than it can be supplied past the valve 27b and orifice 27c. When the pressure governor 14a is thus rendered inactive, the output rod 14c will be caused to move to the bottom of its stroke, so that pilot 14g will be at its lower-most position to effect free communication of hydraulic operating liquid through conduit 20 to speed governor 12.

The function of the "speed corrector servo" 13 is to produce a modifying effect on the action of speed governor 12 so that it will hold constant speed with substantially zero "regulation," which is defined as the variation in speed permitted by the governor when the load varies from minimum to maximum. Without the aid of speed corrector 13, the normal regulation of a governor of the type shown at 12 will be on the order of 4%. However, this is not sufficiently close to "isochronous" for driving generators supplying electrical energy for paper or textile mills. Accordingly, the speed corrector 13 produces steady-state regulation on the order of plus or minus .1%. The speed corrector shown diagrammatically at 13 is generally of a type known previously in the art, speed correctors of this general type being shown for instance in the patents of R. G. Standerwick, 1,629,318 and 1,629,319, issued May 17, 1927, and 1,810,627 issued June 16, 1931, also the U. S. patent of E. D. Dickinson, 1,976,659, issued October 9, 1934, all assigned to the same assignee as the present application.

As shown, the speed corrector 13 comprises a hydraulic speed corrector piston 13a biased downwardly by a weight 13b and connected to a midpoint of follow-up lever 25 by an intermediate lever 13c supported on a fixed fulcrum as shown. The upper limiting position of piston 13a is established by an adjustable stop 13d adapted to engage lever 13c when the limit is reached. The speed corrector piston 13a is positioned by hydraulic liquid supplied through conduit 13e as controlled by pilot 13f, which is connected to a lever 13g pivoted at one end to link 24 and supported on a fixed fulcrum, as shown. The other end of lever 13g is adapted to be positioned by engagement with adjustable stops 13h, 13k threadedly received on the spindle of pilot 13f. The function of stops 13h, 13k is to adjust the relative position of pilot 13f and bushing 12c through levers 13g, 24, 23 and 22 for the value of isochronous speed to be held and to permit taking the speed corrector 13 out of service altogether. By turning stop nut 13h, the pilot 13f may be displaced downwardly to admit oil to hold piston 13a in its uppermost position, with lever 13c against stop 13d, in which condition the speed corrector is inoperative. In this connection it will be seen that a coil spring 13m biases pilot 13f down so stop 13h is held against the forked end of lever 13g. When the speed corrector servo is intended to operate for isochronous governing, these stops are in engagement with the opposite sides of lever 13g, as shown.

In accordance with the invention, special means are provided for disabling the speed corrector servo 13 when the system is operating to hold constant exhaust pressure, and automatic means are provided to bring the speed corrector into operation after a pre-selected time interval, when operation is converted to speed governing. This automatic control device for speed corrector 13 comprises a two-position flow restricting valve 28, which may be in the wide open position (as shown), or it may be in any preselected position between wide open position and its minimum area position, when the system is holding constant pressure with the speed corrector servo 13 inoperative, and which is automatically brought to its minimum area position in order to render the speed corrector servo operative when the system is converted to hold constant speed. The flow restricting valve 28 must be in its minimum flow position for satisfactory operation with the speed corrector in service. However, if it were to remain in the minimum position prior to and during the transfer from exhaust pressure control to speed corrector control, the elapsed time interval for completion of the transfer to isochronous speed governing would be on the order of 15 to 30 seconds. In accordance with the invention, means are provided for holding the flow restricting valve open and to automatically close valve 28 to its minimum area position when operation is converted to speed governing, which automatic means reduces the elapsed time interval for completion of the transfer to as low at ½ to 1½ seconds.

The positioning means for valve 28 comprises a lever 29 connected by rod 30 to a hydraulic piston 31 which is biased downwardly by a spring 32, the lower-most position thereof (corresponding to the minimum effective area of valve 28) being determined by an adjustable stop 33 threaded on spindle 30 and adapted to engage the housing 34. Normally, hydraulic pressure supplied past a flow restricting orifice 35 in conduit 36 holds piston 31 in its upper-most position (as shown) against the bias of spring 32. The "open" position of valve 28, when piston 31 is in uppermost position, may be adjusted to suit the requirements of the particular system in which the turbine is installed, by any suitable means for varying the length of rod 28a, such as the threaded bushing shown in the drawing. Piston 31 is permitted to descend under the influence of spring 32 when pilot 16 is pulled upwardly by solenoid 16a so as to establish communication between conduit 36 and the drain port 16b. A manual throttling valve 37 in conduit 36 between the hydraulic piston 31 and dump valve 16 permits adjusting the rate at which piston 31 will descend. This has the important function of determining the time interval required for the throttling valve 28 to move from its maximum area position to the minimum area position when the speed corrector servo goes into operation.

Having described the various sub-combinations which comprise the complete governing system shown in Figure 1, the overall operation is as follows.

With the tie-line circuit breaker 11 closed, the electrical characteristics of the network 9 determine the speed of turbine 2, and the position of the parts will be as shown in Figure 1 for governing the turbine throttle valve 3 so as to maintain process steam pressure in conduit 5 constant. The value of this pressure is regulated by the handwheel 14d of pressure governor 14a, which governor regulates the pilot valve 14g. Since the speed reset servo piston 15a is held in its uppermost position by hydraulic pressure, the speed setting screw 26a will be maintained in its lowermost position, with the result that speed governor bushing 12c is positioned downwardly sufficiently to establish free communication as indicated by arrow 12e. Thus the pilot 14g associated with pressure governor 14 is free to regulate the flow of operating liquid to hydraulic motor 4, without any interference from speed governor 12.

It is a known characteristic of hydraulic speed correctors of the general type shown at 13 (as described in the above-identified Standerwick Patent 1,629,318) that they perform their speed correcting function only when there is a "phase-lag" introduced by having a flow restriction between the pilot valve 13f and the hydraulic piston 13a, and when hydraulic piston 13a is physically able to position fulcrum X and thereby position bushing 12c through levers 25, 23 and 22 and link 24 so as to cause bushing 12c to be "line to line" with pilot valve 12b, so as to control oil pressure in conduit 21 and thus position motor 4. In order that pressure governor 14 through pilot valve 14g will have complete control of the turbine steam flow for maintaining constant exhaust pressure, synchronizing screw 26a is turned so that trunnion 26b is against high speed stop 26d and bushing 12c is in its lower-most position permitting the oil to flow as shown at 12e. For this position of screw 26a it is impossible for the hydraulic piston 13a to position fulcrum X so as to put bushing 12c "line to line" with pilot valve 12b due to stop 13d. Therefore, hydraulic piston 13a will maintain lever 13c against stop 13d and thus fulcrum X will be fixed in space at all times when pressure governor 14 through pilot 14g is in control of the turbine. Also, the flow restriction between the pilot valve 13f and hydraulic piston 13a required for proper functioning of the speed corrector servo is provided by valve 28. Thus the speed corrector is inoperative when valve 28 is wide open, as shown in the drawing; and therefore the speed corrector servo 13 has no effect on the operation of the system when the pressure governor 14 is controlling the turbine.

If now some failure should occur in the power distribution network 9 causing tie-line breaker 11 to open automatically, or if breaker 11 should be tripped open manually for any reason, the failure of current in solenoid 19a will cause contacts 19b to close, thus simultaneously energizing solenoid valves 16, 17, 18. The resulting loss of the pressure signal in conduit 27 immediately disables the pressure governor 14a and positions pilot valve 14g downwardly so as to permit free flow of pressure oil to conduit 20. Simultaneously, the speed reset servo piston 15a descends and causes the synchronizing screw 26 to rise, thus elevating bushing 12c so as to bring the ports therein into alignment with the lands of pilot 12b, so that the speed governor takes over control of hydraulic motor 4. As will be appreciated by those skilled in the art, the normal operating condition for governor 12, when in control of the turbine speed, is with one of the lands of the pilot 12b in aligned or "line-to-line" relation with the supply port in bushing 12c, with the other land aligned with dump port 12f.

Meanwhile, solenoid valve 16a has also established communication between conduit 36 and drain port 16b, with the result that the piston 31 begins to descend, but at a preselected rate as determined by the adjustment of valve 37. This adjustment, for instance, may be so set that it requires on the order of ½ to 1½ seconds for the adjustable throttling valve 28 to move from its "open" position to the minimum area position, when solenoid valve 16 opens. The result is that, when the speed governor 12 first takes over, it reacts quickly (with valve 28 wide open) to establish the speed preselected by the speed reset servo 15, the speed v. load regulation at the instant of change-over being truly zero. This prompt response of speed governor 12 insures that the speed of turbine 2 will experience the absolute minimum deviation from the normal speed required by the load devices 7. However, the system would not be sufficiently stable if this condition were to persist for any length of time. Therefore, the effect of the progressive closing of flow restriction 28 is to provide the "phase lag" necessary for stable operation on speed corrector control, and to change the degree of regulation of speed governor 12 from zero to its normal value of 4% on instantaneous load changes, with zero regulation (within 0.1%) upon gradual load changes taking several minutes to effect. The adjustable valve 37 will of course be positioned as found necessary in service so as to achieve sufficiently quick response of speed governor 12 when the automatic transfer relay 19 trips, yet at the same time bringing the speed corrector servo 13 into operation sufficiently promptly as to obtain the desired isochronous governing.

Thus the system effectively permits automatic changeover from pressure governing to speed governing with minimum chance of disturbance in the speed of the load devices 7.

While the above description indicates how the invention may be applied to a governing system arranged to convert from "exhaust pressure governing" to "speed governing," alternate governing components may be substituted for the pressure governor 14. In this connection, Figure 2 represents a "load limit governor" 38 comprising an adjustable stop in the form of a lever 39 having an end portion 39a adapted to be engaged by an abutment 3b secured to throttle valve actuating rod 3a. The position of the stationary abutment 39a is adjusted by a screw 40 which may be rotated manually by the handwheel 41, or remotely by a positioning motor (not shown). In normal operation, with the tie-line circuit breaker 11 closed so that the speed of turbine 2 is determined by its electrical interconnection with the network 9, the stop 39a will be positioned as shown in Figure 2 so that throttle valve rod 3a cannot move in the opening direction past a limiting position determined by the engagement of abutment 3b with the stop 39a. Since the "load" on the turbine is a function of the movement of valve rod 3a, the abutment 39a establishes a load limit for the turbine.

It is necessary to remove the limiting effect of abutment 39a when the system is converted to speed governing, and to this end a hydraulic piston 42 is connected to pull adjusting screw 40 downwardly so as to move abutment 39a upwardly to such an extent that it no longer establishes a limiting position for abutment 3b. As will be apparent in Figure 2, piston 42 is biased downwardly by coil spring 43 and is normally held in uppermost position by hydraulic pressure established under the piston by supply of hydraulic liquid through a conduit 44 containing a flow restriction 45. Piston 42 may be caused to descend either manually by opening the drain valve 46 or automatically when the solenoid 47 is energized to raise pilot 48 so that conduit 44 communicates with drain conduit 49.

It will be obvious to those skilled in the art how the load limit arrangement shown in Figure 2 may be substituted for the pressure governor 1, in which event the solenoid 47 would also be connected to be energized by the automatic transfer relay 19 in Figure 1.

It will also be apparent to those familiar with turbine governor design that the load limit governor shown in Figure 2 may be incorporated in a governing system which also has a pressure governor 14 as shown in Figure 1. Then if it is desired to operate on the pressure governor, the disabling valve 46 of the load limit governor will be opened, whereas if it were desired to operate on the load limit governor, the valve 27a of the pressure governor would be opened.

Thus, broadly, the invention comprises means for operating on any one of several different governing devices, with automatic means for transferring to speed control, with the speed corrector servo 13 being brought into operation after a preselected time interval has elapsed. Without the invention, a time interval of on the order of 30 seconds may elapse, when switching to speed governing, before the system settles down to stable "isochronous" operation; while with the invention this interval is reduced to a value between ½ to 1½ seconds.

Still other changes and substitutions of equivalents will be apparent to those familiar with such turbine governing systems; and it is desired to cover by the appended claims all such modifications as fall within the true spirit and scope of the invention.

What I claim as new and desire to secure by Letters Patent of the United States is:

1. In a governing system for a prime mover having a throttle member adapted to regulate the supply of motive fluid thereto with motor means for establishing the position of the throttle, the combination of isochronous speed governor means connected to control the throttle motor, and other governing mechanism adapted to control the positioning of the throttle member in normal operation, means for disabling said other governing mechanism, said isochronous speed governor comprising a speed-responsive device adapted to position the throttle motor to maintain constant speed, linkage means connected to the throttle member to produce a follow-up effect on the speed governor, and speed corrector means connected to said linkage to modify the action of the speed governor to effect isochronous governing, said speed corrector including second hydraulic motor means with pilot valve means adapted to regulate the supply of operating liquid thereto to effect the speed correcting function, conduit means connecting said pilot to said second hydraulic motor and including variable flow restricting means for limiting the rate of supply of operating liquid to the second motor, said flow restricting means having an open position and a minimum flow position, third motor means for moving said flow restriction from its open position to its minimum flow position at a preselected rate of travel, and means for simultaneously effecting actuation of said disabling means for the other governing mechanism and effecting actuation of said third motor to render the speed corrector operative after a preselected interval.

2. A governing system for a steam turbine prime mover in accordance with claim 1 in which the other governing mechanism is a pressure responsive governor adapted to hold constant the pressure of steam exhausted from the turbine.

3. A governing system for a steam turbine prime mover in accordance with claim 1 in which the other governing mechanism is a load limit governor having an adjustable stop for determining a limiting position for the throttle member, with means for automatically removing said stop when the system is converted to speed governing.

4. In a governing system for a prime mover having a throttle member adapted to regulate the supply of motive fluid thereto and motor means for establishing the position of the throttle, the combination of isochronous speed governor means adapted to control the throttle positioning motor, first servo mechanism for automatically determining the speed to be held by the speed governor, other governing mechanism adapted to control the positioning of the throttle member in normal operation, second servo means for disabling said other governing mechanism, the isochronous speed governor comprising a speed responsive device adapted to position the throttle motor to hold a speed determined by said first servo mechanism, linkage means connected to the throttle member to produce a follow-up effect on the speed governor, and speed corrector means connected to said linkage to modify the action of the speed governor to effect isochronous governing, said speed corrector including a second hydraulic motor with a pilot valve adapted to regulate the supply of operating liquid thereto to effect the speed correcting function, conduit means connecting said pilot and second hydraulic motor and including variable flow restricting means for limiting the rate of supply of operating liquid to the second motor, said flow restricting means having an open position and a minimum flow position, third servo means for causing said flow restricting means to move from its open position to its minimum flow position at a preselected rate of travel, and means for simultaneously effecting actuation of said first servo mechanism to establish the speed setting of the isochronous governor and effecting actuation of said second servo mechanism for disabling the other governor and effecting actuation of said third servo mechanism to render the speed corrector operative after a preselected interval.

5. In a governing system for a prime mover having a throttle member adapted to regulate the supply of energy thereto and motor means for establishing the position of the throttle, the combination of isochronous speed governor means connected to control the throttle positioning motor, first servo mechanism for automatically setting the speed to be held by the speed governor, other governing mechanism adapted to control the positioning of the throttle member in normal operation, second servo mechanism for disabling said other governing mechanism, the isochronous speed governor including a speed responsive device connected to position the throttle motor to hold a speed determined by said first servo mechanism and speed corrector means connected to modify the action of the speed governor to effect isochronous governing, said speed corrector including third servo means for placing the speed corrector into operation at a preselected rate, and means for simultaneously effecting actuation of said first servo mechanism to establish the speed setting of the isochronous governor and also effecting actuation of said second servo mechanism to disable said other governing means and effecting actuation of said third servo mechanism to render the speed corrector fully operative after a preselected time interval.

6. In a governing system for an elastic fluid turbine having a throttle valve for regulating the supply of motive fluid thereto and motor means for establishing the position of the throttle valve, the combination of isochronous speed governor means connected to control the throttle valve positioning motor, a first speed setting servo mechanism connected to the speed governor to establish the speed to be maintained thereby, other mechanism adapted to control the positioning of the throttle member in accordance with an operating condition other than speed in normal operation, second servo mechanism for disabling said other governing mechanism, the isochronous speed governor comprising a speed responsive device connected to position the throttle motor to hold a speed determined by said first servo mechanism, linkage means connected to the throttle valve to produce a follow-up effect on the speed governor, and third hydraulic speed corrector servo mechanism connected to said linkage to modify the action of the speed governor to effect isochronous governing, the hydraulic speed corrector including fourth hydraulic motor means with a pilot valve adapted to regulate the supply of operating liquid thereto to effect the speed correcting function, conduit means connecting said pilot and fourth hydraulic motor and including variable flow restricting means for limiting the rate of supply of operating liquid to said fourth motor, said flow restricting means having an open position and a minimum flow position, fifth hydraulic servo mechanism for causing said flow restricting means to move from its open position to its minimum flow position at a preselected rate of travel, and means for simultaneously effecting actuation of said first servo mechanism to establish the speed setting of the isochronous governor and effecting actuation of said second servo mechanism for disabling the other governing means and effecting actuation of said fifth servo mechanism to render the speed corrector operative after a preselected time interval.

7. Multiple governing means for an elastic fluid turbine type prime mover in accordance with claim 6 in which the turbine drives a generator interconnected with an electric power distribution network by a tie-line including a circuit breaker for disconnecting the prime mover from the network and the means for simultaneously effecting actuation of said servo mechanisms comprises solenoid-operated pilot valves connected to be simultaneously energized by a relay responsive to characteristics of the tie-line current.

JACK M. BAKER.

REFERENCES CITED

The following references are of record in the file of this patent:

UNITED STATES PATENTS

| Number | Name | Date |
|---|---|---|
| 1,629,318 | Standerwick | May 17, 1927 |
| 1,629,319 | Standerwick | May 17, 1927 |
| 1,759,763 | Standerwick | May 20, 1930 |
| 1,810,627 | Standerwick | June 6, 1931 |
| 1,841,425 | Taylor | Jan. 19, 1932 |
| 1,969,526 | Rosch | Aug. 7, 1934 |
| 1,976,659 | Dickinson | Oct. 9, 1934 |
| 2,253,963 | Van Nest | Aug. 26, 1941 |